Figure 1:
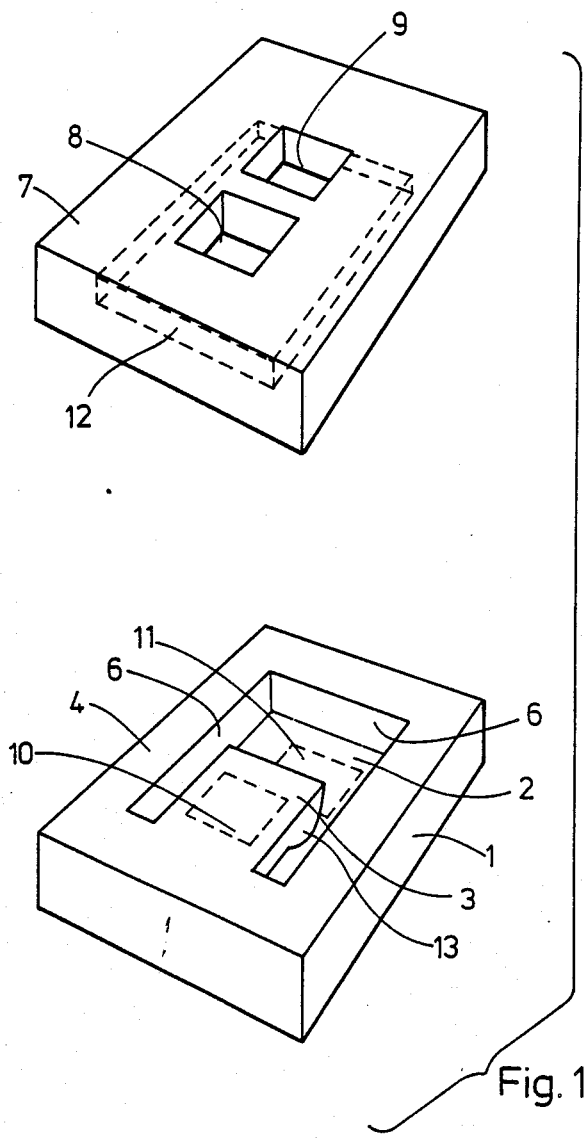

United States Patent [19]

Hök et al.

[11] Patent Number: 4,895,500
[45] Date of Patent: Jan. 23, 1990

[54] MICROMECHANICAL NON-REVERSE VALVE

[76] Inventors: Bertil Hök, Sportfiskaregatan 53, Västerås, Sweden, S-723 48; Lars Tenerz, Ringgatan 20C, Uppsala, Sweden, S-752 27; Jonas Tirén, Geijersgatan 13C, Uppsala, Sweden, S-752 26

[21] Appl. No.: 334,578

[22] Filed: Apr. 7, 1989

[30] Foreign Application Priority Data

Apr. 8, 1988 [SE] Sweden ................................ 8801299

[51] Int. Cl.$^4$ ............................................. F16K 15/16
[52] U.S. Cl. ................................ 417/566; 137/512.4; 137/855; 417/413; 417/560
[58] Field of Search ............................ 137/512.4, 855; 417/413, 560, 566; 357/26

[56] References Cited

U.S. PATENT DOCUMENTS

| 4,573,888 | 3/1986 | Kitchin | 417/560 |
| 4,585,209 | 4/1986 | Aine | 137/855 X |
| 4,770,740 | 9/1988 | Tsuzuki | 137/517 X |

Primary Examiner—Robert G. Nilson
Attorney, Agent, or Firm—Witherspoon & Hargest

[57] ABSTRACT

A silicon micromechanical non-reverse valve. In a main surface of a silicon wafer there is provided a cavity and a cantilever beam. The beam extends over the cavity and is integrally formed with the wafer at its top portion. The beam is provided at a distance above the bottom wall of the cavity. A second wafer of silicon or glass is provided over the first silicon wafer and covers the cavity in order to form a chamber. A second wafer is provided with two openings one of which is situated within the outline of the beam and the other of which is situated outside said outline. The first opening acts as an inlet and the second opening as an outlet for the valve.

20 Claims, 5 Drawing Sheets

MICROMECHANICAL NON-REVERSE VALVE

The present invention relates to a micromechanical silicon wafer non-reverse valve. The dimensions of the valve are less than about 40 mils. Perhaps the most intriguing results of the present dynamic research activities in the field of silicon micromechanics is the possibility of integration between micromechanical devices such as valves, pumps etc. with electronic devices such as motors, generators etc. An example thereof is the Sanford gas chromatograph, IEEE Trans. On Electronic Devices Vol. ED-26, No. 12, Dec. 1979, "A Gas Chromatographic Air Analyser Fabricated on a Silicon Wafer", by S. C. Terry et al.

Non-reverse valves could serve as extremely useful building blocks in future microfluidic systems. In fact one can envisage a proportionality in importance to its electronic counterpart, the diode. Together with one single active device, e.g. an oscillating membrane, the non-reverse valve can form a pump with a performance that can be predicted from a small number of parameters such as oscillation amplitude and frequency, opening pressure, compliance and dead volyme of the valve.

Possible immediate applications of such a device are in gas and fluid analysis, drug delivery and ink jet printing. Interesting future application fields are implanted prosthetic systems, such as an artificial pancreas.

A microvalve is known from Forschungsbericht T84-209 Sept. 1984, Fraunhofer-Institute für Festkörpertechnology, München/Berlin, L-Csepergi, K. Kyhl, R. Nissel and H. Seidel. Compare also European patent EP-A-No. 250 948. This known valve comprises a membrane suspended in two arms and adapted to close an opening through which liquid is flowing. The arm and membrane structure is etched out from a silicon wafer but is difficult to mass-produce and has large dimensions. Moreover the total mass of the arm and membrane structure is large making the valve slow responsive.

The present invention relates to a micromechanical non-reverse valve that can be manufactured by thousands in a batch process using electrochemical doping selective etching of monocrystalline silicon and by using anisotropic etching. The valve will then take the eminent mechanical characteristics of silicon. This is due to the fact that silicon has an extremely high E/r-ratio, where E is Young's modulus of elasticity and r is the density. This ratio will determine the natural vibration frequency of the mechanical structure. Moreover, silicon has a high tensile strength and a high stiffness both being comparable to the corresponding characteristics of stainless steel. This is inter alia due to the fact that the silicon crystals are perfect and can be produced generally without any dislocations.

Figure 2:
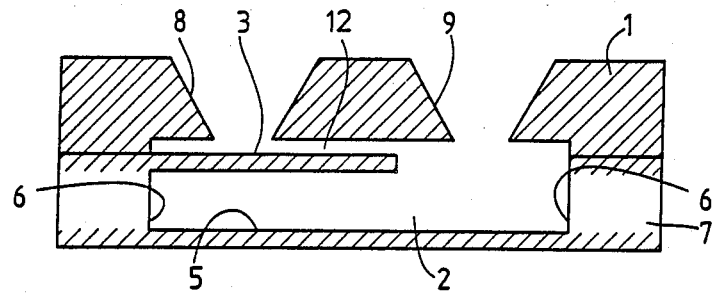
Figure 3:
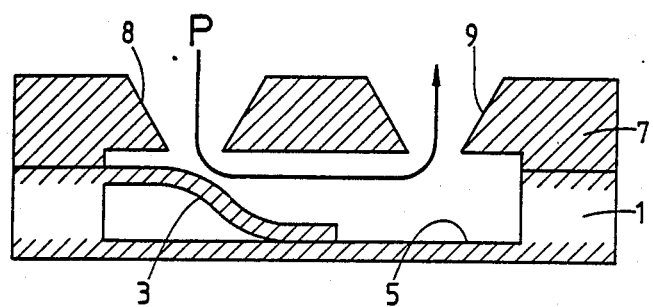
Figure 4:
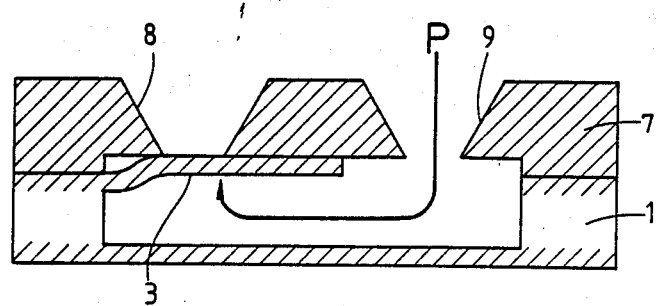
Figure 5A:
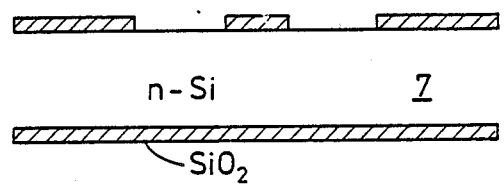
Figure 5B:
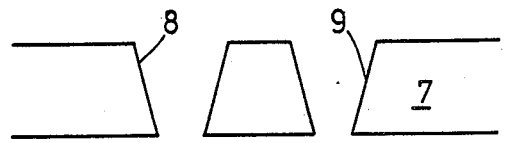
Figure 5C:
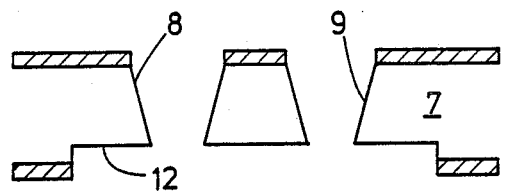
Figure 6A:
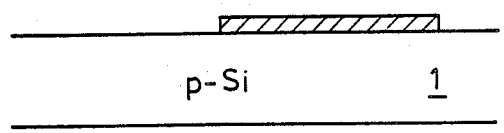
Figure 6B:
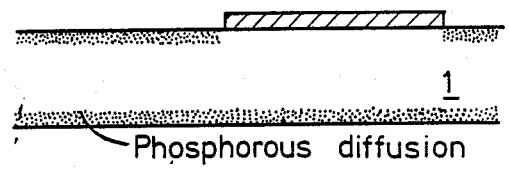
Figure 6C:
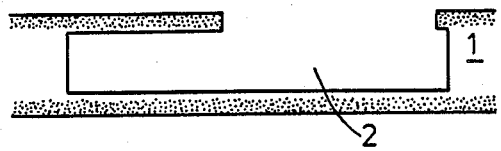
Figure 7:
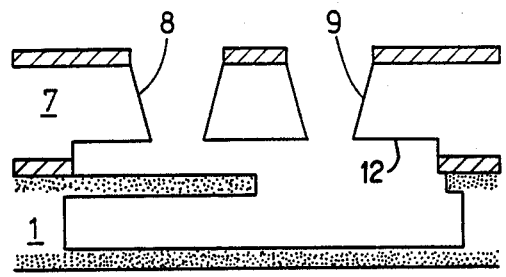
Figure 8:
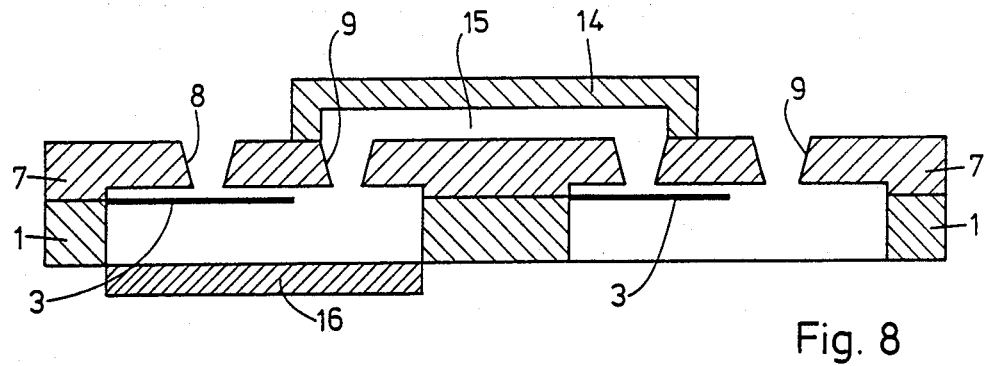
Figure 9:
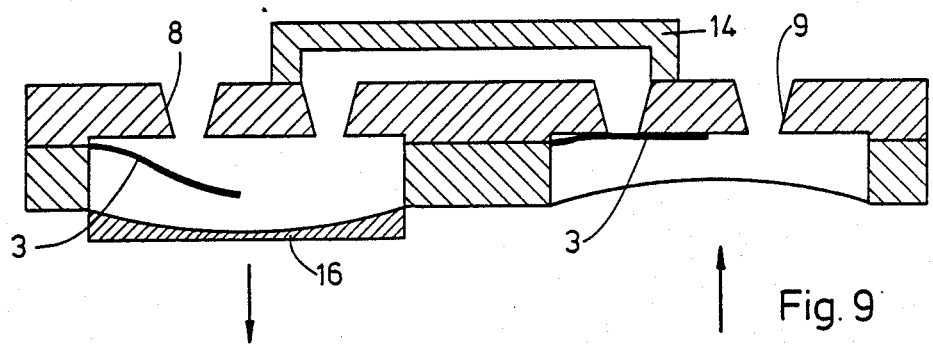
Figure 10:
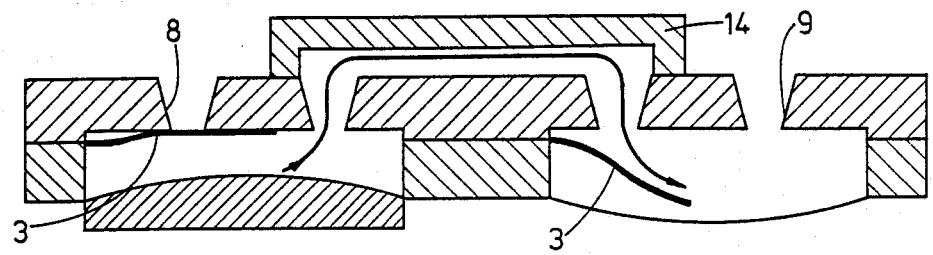
Figure 11:
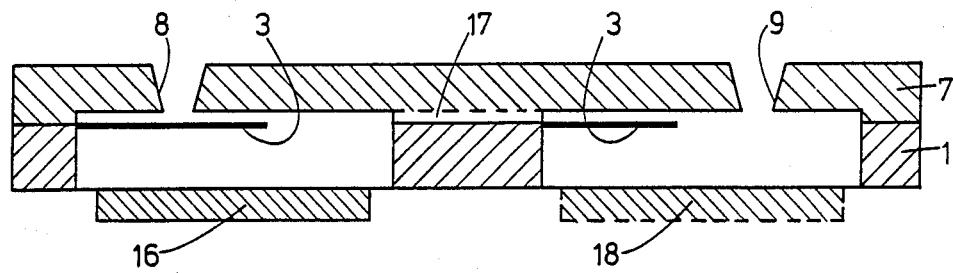
Figure 12:
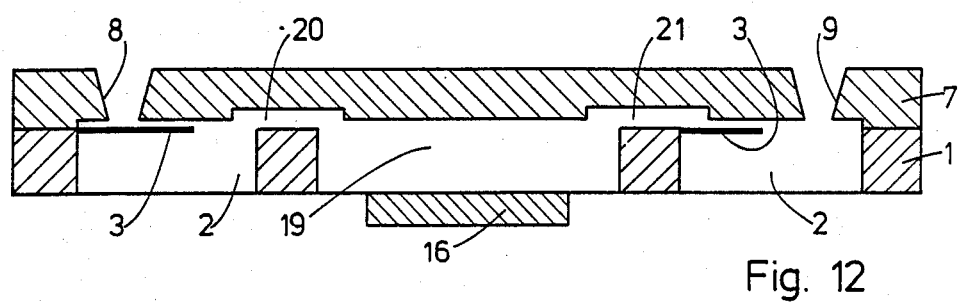
Figure 13:
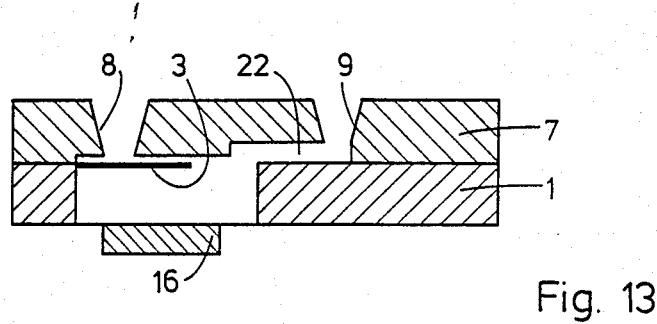

The invention will be described in more detail below in connection with the attached drawings, wherein FIG. 1 is an exploded view of a non-reverse valve in accordance with the present invention, FIG. 2 is a cross-sectional view of the non-reverse valve in accordance with the present invention, FIG. 3 is a cross-sectional view similar to that of FIG. 2 and is showing the non-reverse valve in a state wherein a fluid is flowing through the non-reverse valve in its forward direction, FIG. 4 is a cross-sectional view similar to that of FIG. 2 and is showing the non-reverse valve in a state wherein the static pressure of a fluid is acting on the valve in its reverse direction, FIGS. 5a–c are schematic cross-sectional views illustrating the etching process for producing one of the two components making up the valve in accordance with the invention, FIGS. 6a–c are schematic cross-sectional views of the electro-chemical etching process by which the second of the two components making up the non-reverse valve in accordance with the present invention is formed, FIG. 7 is a cross-sectional view showing two components mounted together and forming the non-reverse valve in accordance with the present invention, FIG. 8 is a cross-sectional view of a membrane pump formed by two non-reverse valves in accordance with the invention, FIG. 9 is a cross-sectional view showing the membrane pump during a first phase of its operation, FIG. 10 is a cross-sectional view similar to that of FIG. 9 showing the membrane pump during a second phase of its operation, FIG. 11 is a cross-sectional view of a second embodiment of a membrane pump formed by two non-reverse valves in accordance with the invention, FIG. 12 is a cross-sectional view of third embodiment of a membrane pump in accordance with the invention and FIG. 13 is a cross-sectional view of a fourth embodiment of a membrane pump formed by only one non-reverse valve in accordance with the present invention.

FIG. 1 is an exploded view showing a first embodiment of a micromechanical non-reverse valve in accordance with the present invention. The valve comprises a first silicon wafer 1 having a cavity or recessed portion 2. A beam 3 integral with the silicon wafer 1 extends out over the cavity like a high-board. The top surface of the beam lies in the same plane as the top surface 4 of the silicon wafer 1. In FIG. 1 the width of the cavity is shown unduly wide. Ideally its width is only slightly wider or as broad as the width of the beam. The cavity has a bottom wall 5 (FIG. 2) and side walls 6.

A second silicon wafer 7 adapted to be bonded by sealing to the first wafer 1 is provided with two through openings 8, 9 so positioned relative to the beam 3 that when the second wafer 7 has been bonded by sealing to the first wafer 1 the outline of the through opening 8, projected upon the top surface of the beam, will fall completely within the outline of the beam 3 as is indicated with the broken line rectangle 10, whereas the outline of the opening 9, projected upon the bottom wall 5, will fall outside the tip of the beam 3 but inside the side wall 6 opposite to the tip of the beam. The projection of the opening 9 on the bottom wall 5 is indicated with the broken line rectangle 11. The beam 3 and the openings 8, 9 are all aligned and the outline of the opening 8 as projected on the beam 3 is centered on the beam in the longitudinal direction thereof. Opening 8 is adepted to be connected to an inlet fluid line while opening 9 is adapted to be connected to an outlet fluid line. In FIG. 1 the length of the cavity 2 is also shown unduly long. Ideally its length is the sum of the length of the beam 3 plus the length of the opening 9 in the longitudinal direction of the beam. The cavity 3 has a depth which is slightly larger than the thickness of the beam. The cavity and beam dimensions referred to above will provide for a minimum dead volume this rendering the non-reverse valve fast responsive.

The bottom surface of the second wafer 7 has a recess 12 (FIG. 1) the outline of which is slightly larger than that of the beam. The reason for this will be described further below. FIG. 2 is showing the complete non-reverse valve after mounting the second wafer 7 on the first wafer 1 by using conventional bonding technique, for example anodic bonding of the kind described by A. D. Brooks, R. P. Donovan, C. A. Hardesty "Low temperture electrostatic silicon to silicon seals using sputtered borosilicate glass", J Electrochem Soc 119, 1972, or atomic bonding of the kind described by J. B. Lasky, S. R. Stiffler, F. R. White, J. R. Abernathey "Silicon-on-insulator (SOI) by bonding and etch-back". International electronic devices meeting 85, Washington, Dec. 1985, pp. 684-687 also referred to as field assisted bonding, or using glue.

As mentioned above pure silicon has excellence mechanical strength and deflection characteristics. The beam 3 takes advantage of these features for its operation as will be described in conjunction with FIGS. 3 and 4. If a pressure P (FIG. 3) is applied at the inlet opening 8, which will happen if a liquid or a gas is flowing through said opening, the cantilever beam 3 will deflect in a downward direction in the manner shown until the beam contacts the bottom wall 5. The gas or fluid will then flow along the chamber formed by the cavity 2 and the recess 12 and will exit the outlet opening 9 in the forward direction of the non-reverse valve. If, however, a gas or a liquid is forced into said chamber from the outlet opening 9 in the manner shown in FIG. 4, that is in the reverse direction of the valve, then the pressure P will deflect the beam in a direction upwardly and the beam will close the inlet opening 8. If said latter pressure P is increased when the closing pressure acting on the inlet opening 8 will also increase. Due to the excellent mechanical properties of silicon the cantilever beam 3 will resists considerable deflection in the direction shown in FIG. 3 as well as in the direction shown in FIG. 4 without cracking. Due to the stiffness of silicon the beam will exhibit a high self-resonant frequency, in the order of about 40 kHz and the system formed by the beam, the chamber and the fluid will have a high Q value. Q-values in the order of $3 \cdot 10^3$ can be expected for a low gas pressure. The Q-value will increase if fluids are used.

The maximum pressure which the beam 3 can resist when the pressure P is acting in the reverse direction (FIG. 4) of the is in the order of about $$P = \frac{4 a^2 l^3}{w t^3 E}$$

where t=beam thickness, a=the length of the openings 8, 9 when these openings are equal and square and l=the distance from root of the beam up to the point where the pressure P is applied, and w and E are constants. From the above relation it is apparent that the maximum pressure is strongly dependent on the size of the openings and on the thickness of the beam. If, for estimation purposes only, a and t are set equal, then it is apparent that the beam can resist impressive pressures. The maximum pressure the valve can resist in the reverse direction will increase if the outermost portion of the beam 3 is provided with a thick portion 13 (FIG. 1).

If the non-reverse valve is operated with a fluid that flows in the direction indicated in FIG. 3 it can be shown that the volume flow Q is proportional to the fourth order of the pressure P and that the proportional constant is dependent on the dimensions of the valve as well as of the beam. Small changes of the dimensions, for example small changes of the length or width of the beam or of the dimensions of the cavity 2 will have a large influence on the characteristics of the valve. If on the other hand the beam is in its lowermost position as shown in FIG. 3, then the valve's resistance to flow will mainly depend on the geometrical dimensions of the openings 8 and 9 since these dimensions are smaller than any other geometrical dimensions (besides from the thickness of the beam). Therefore, the volume flow in this case will be a linear function of the pressure i.e. Q=CP.

It is therefore apparent that the flow, when the pressure is low, will depend on the fourth order of P ($P^4$) while an increasing pressure finally will result in a saturated flow which is linearly related to the pressure.

It should be noted that a minor space exists between the beam in its rest position and the opening 8 said minor space being in the form of the above recess 12. This minor space is required in order to prevent the beam from adhering to the bottom surface of the second wafer 7 when the wafers 1-7 are bonded together. Because of this minor space or recess, indicated with reference numeral 12 in FIGS. 1 and 2, a small leakage flow will take place in the reverse direction of the valve.

FIGS. 5a-b illustrate the way in which the second wafer 7 is produced. In a manner known per se n-type silicon was provided with a layer of $SiO_2$ on each side. By using previously known masking technique a pattern for the openings 8, 9 was provided in the $SiO_2$ layer as shown in FIG. 5a. Thereafter an anisotrop etching was performed using EDP, KOH, NaOH or a similar known etching liquid. The result is shown in FIG. 5b. In order to prevent leakage the dimensions of the openings were slightly shorter than the width of the beam.

After the anisotrop etching of the holes the recess 12 was etched using for example KOH down to a depth of some 0.04 mils. At the same time a grating, not shown, for cracking the silicon wafer was etched.

The first silicon wafer 1 was treated using electrochemical doping selective etching in for example KOH. This process is will known and easy to control. A first oxidation in a wet environment was performed in order to produce an about 8000 Å thick oxide layer. Using conventional lithographic technique a mask pattern corresponding to the outline of the beam and the top outline of the cavity was performed as shown in FIG. 6a. Thereafter the silicon wafer was doped using an impurity, in this case phosphorus, using diffusion doping down to a depth corresponding to the thickness of the beam 3, in this case about 0.4 mil, compare FIG. 6b. The silicon wafer was cut along the <100> plane and the beams had their long sides parallel to the silicon crystal <100> directions in the silicon crystal so as to shorten the etching times. After the drive-in of the dopant the beams were etched out by selective electrochemical means in potassium hydroxide. The etching was performed at 70° C. and the etchant was mixed to an proportion of 50 gr KOH per 100 ml water. A platinum electrode was used to complete the electrochemical cell. The resulting structure was a cantilever beam ("high board") over the cavity. Other dope selective procedures using for example n-doped silicon, can also be used in order to produce the beam and the cavity.

On each silicon wafer 1, 7 about 800 units of the type shown in FIGS. 5 and 6 were etched. The wafers were then bonded together in the manner described above and were finally cracked along the lines of the grating, not shown, to produce separate non-reverse valves (FIG. 1).

The final non-reverse valve had a dimension of about 40 mils the outline of the wafers 1, 7 included. In a tested embodiment using silicon for wafers 1, 7 a distance between the openings 8, 9 was about 0.04 mils, the length of the beam 3 was about 25 mils, the thickness of the beam abut 0.4 mils and the width of the beam about 12 mils.

In accordance with an alternate embodiment of the valve the openings 8 and 9 are arranged side by side and the projection 11 of the opening 9 will then fall at the side of the beam 3. in this alternate embodiment the cavity 2 will have a width sufficient to include the two openings. In accordance with another alternate embodiment the second wafer 7 is made of glass the thermal expansion coefficient of which is the same as that of silicon. The openings 8, 9 in the second wafer 7 of glass are formed by drilling and the cavity 12 is formed by etching.

In FIGS. 8–10 there is shown how two non-reverse valves in accordance with the invention can be series connected in order to form av membrane valve. The outlet opening 9 of the left valve is connected to the inlet opening 8 of the right valve using a third wafer 14 of silicon or glass, the glass having the same thermal expansion coefficient as that of silicon. In said third wafer 14 a channel 15 is etched. An actuator 16 is firmly attached to the outer surface of the bottom wall 5 of the cavity 2. The actuator 16 is a piezoelectric, a pneumatic, a resistive or an electromechanical actuator vibrating the bottom wall as shown in FIGS. 9 and 10. Said bottom wall will then act as an elastic membrane. When the membrane of the left valve bulges outwardly (FIG. 9), thereby drawing liquid into the cavity, the membrane of the right valve bulges inwardly and will press out liquid, which previously has been drawn in liquid through the outlet opening 9 of the right valve, the beam of the right valve preventing liquid flow in the reverse direction. This is one working phase of the operation of the membrane pump. Then, when the actuator 16 bulges the membrane of the left valve inwardly (FIG. 10) the liquid drawn into the cavity of the left valve will be pressed through the channel 15 and will enter the cavity of the left valve, the beam 3 of the right valve preventing flow in the reverse direction of the valve, and in entering the cavity of the right valve the liquid will press down the beam 3 of the right valve.

Still another embodiment of the membrane pump is shown in FIG. 11. In this embodiment the non-reverse valve has been so modified that the outlet opening of the left valve and the inlet opening of the right valve have been eliminated and replaced by a connection channel 17 provided in the second wafer 7 by etching. The rest of the construction is similar to that shown in FIGS. 8–10. It is possible to provide a further actuator 18 under the cavity of the right valve. This further actuator is adapted to support pumping and operates in opposite phase to that of the actuator 16.

A third membrane pump embodiment is shown in FIG. 12 wherein a cavity 19 has been provided between the cavities 2 of two adjacent non-reverse valves, for example using the above mentioned electrochemical dope selective etching procedure. Also in this embodiment the outlet opening of the left valve has been replaced by a connection channel 20 to the cavity 19. In a similar manner there is a connection channel 21 from the cavity 19 to the inlet side of the right valve. Channels 20 and 21 are etched out in the bottom surface of the second wafer 7. The actuator 16 is attached to the bottom surface of the cavity 19, said bottom surface when acting as a membrane.

In FIG. 13 a fourth embodiment of a membrane pump is shown. In this embodiment the non-reverse valve in accordance with FIG. 7 is used. The outlet opening 9 communicates with the cavity 2 through an outlet channel 22 etched out in the bottom surface of the wafer 7. The actuator 16 is attached on the outer surface of the bottom wall of the cavity 2. The connection channel 22 is so dimensioned that its flow resistance will prevent the liquid pumped through the valve to flow back to the cavity 2 in the reverse direction of the valve when the membrane bulges outwardly and the liquid is drawn into the cavity 2. When the valve is in its open state its flow resistance should be much smaller than the flow resistance of the outlet channel 22 in order to achieve a pumping action.

We claim:

1. A silicon micromechanical non-reverse valve comprising
   a first silicon wafer having a cavity in one of its main surface and provided with a cantilever beam integral with the top portion of said first wafer, extending over said cavity and being arranged at a distance above the bottom wall of the cavity,
   and a second wafer made of a material selected from the group which consists of silicon and glass, said second wafer being provided over the first wafer and covering the cavity thereof in order to form a chamber, said second wafer being provided with two openings one of which is situated within the outline of the beam and the other being situated outside said outline, said first opening acting as an inlet and said second opening acting as an outlet for the valve.

2. Micromechanical non-reverse valve in accordance with claim 1, wherein the tip portion of said cantilever beam is provided with a thick portion.

3. Micromechanical non-reverse valve in accordance with claim 2, wherein said beam has a length in the order of about 25 mils, a thickness in the order of about 0.4 mils and a width in the order of about 12 mils.

4. Micromechanical non-reverse valve in accordance with claim 3, wherein the form of the cavity and the form of the beam both are rectangular.

5. Micromechanical non-reverse valve in accordance with claim 4, wherein the two main surfaces on the first wafer both are doped with an impurity down to a depth corresponding to the thickness of the beam which later on is etched in the wafer.

6. Micromechanical non-reverse valve in accordance with claim 5, wherein the cavity and the beam are formed by dopant selective etching of silicon of <100>-type in KOH with the beam so oriented that the sides thereof are parallel with the <100> direction of the silicon crystal.

7. Micromechanical non-reverse valve in accordance with claim 4, wherein said second wafer on its surface opposite to the first wafer is provided with a silicon dioxide layer which in the region over said beam have been removed in order to form a recess between the bottom surface of the second wafer and the top surface of the beam.

8. Micromechanical non-reverse valve in accordance with claim 3, wherein the two main surfaces of the first wafer both are doped with an impurity down to a depth corresponding to the thickness of the beam which later on is etched in the wafer.

9. Micromechanical non-reverse valve in accordance with claim 3, wherein said second wafer on its surface opposite to the first wafer is provided with a silicon dioxide layer which in the region over said beam have been removed in order to form a recess between the bottom surface of the second wafer and the top surface of the beam.

10. Micromechanical non-reverse valve in accordance with claim 2, wherein the two main surfaces of the first wafer both are doped with an impurity down to a depth corresponding to the thickness of the beam which later on is etched in the wafer.

11. Micromechanical non-reverse valve in accordance with claim 1, wherein the two main surfaces of the first wafer both are doped with an impurity down to a depth corresponding to the thickness of the beam which later on is etched in the wafer.

12. Micromechanical non-reverse valve in accordance with claim 11, wherein the cavity and the beam are formed by dopant selective etching of silicon of <100>-type in KOH with the beam so oriented that the sides thereof are parallel with the <100> direction of the silicon crystal.

13. Micromechanical non-reverse valve in accordance with claim 12, wherein said second wafer on its surface opposite to the first wafer is provided with a silicon dioxide layer which in the region over said beam have been removed in order to form a recess between the bottom surface of the second wafer and the top surface of the beam.

14. Micromechanical non-reverse valve in accordance with claim 11, wherein said second wafer on its surface opposite to the first wafer is provided with a silicon dioxide layer which in the region over said beam have been removed in order to form a recess between the bottom surface of the second wafer and the top surface of the beam.

15. Micromechanical non-reverse valve in accordance with claim 1, when said second wafer is of silicon, wherein the openings provided in the second wafer are produced by anisotrop etching.

16. Micromechanical non-reverse valve in accordance with claim 15, wherein said second wafer on its surface opposite to the first wafer is provided with a silicon dioxide layer which in the region over said beam have been removed in order to form a recess between the bottom surface of the second wafer and the top surface of the beam.

17. Micromechanical non-reverse valve in accordance with claim 1, wherein said second wafer on its surface opposite to the first wafer is provided with a silicon dioxide layer which in the region over said beam have been removed in order to form a recess between the bottom surface of the second wafer and the top surface of the beam.

18. Micromechanical non-reverse valve in accordance with claim 17, wherein a further recess of restricted depth is provided in said region where the silicon dioxide layer has been removed in order to increase said recess.

19. Micromechanical non-reverse valve in accordance with claim 18, when said second wafer is of silicon, wherein said first and second wafers are bonded to each other using atomic bonding or anodic bonding (also referred to as field assisted bonding).

20. A membrane pump comprising a membrane adapted to be vibrated, a fluid duct a portion of which is formed by said membrane and at least one non-reverse valve provided in said fluid duct in order to direct the fluid pumped by the membrane vibrations generally in one flow direction along the fluid duct, said non-reverse valve being of the type indicated in claim 1 and said membrane being the bottom wall of the cavity.

* * * * *